Figure 1:
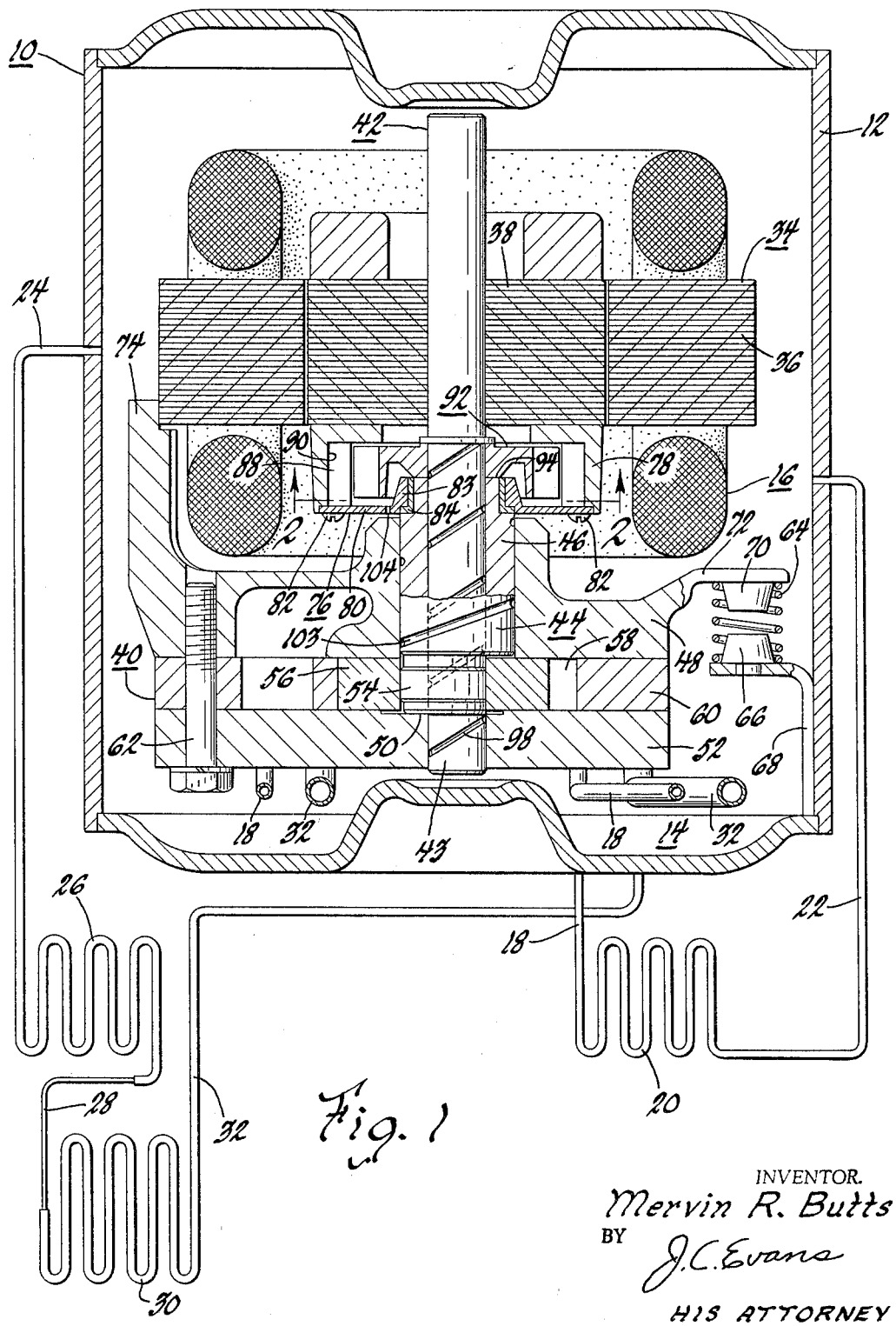

Dec. 13, 1966 M. R. BUTTS 3,291,383
REFRIGERATING APPARATUS
Filed Jan. 26, 1965 3 Sheets-Sheet 2

INVENTOR.
Mervin R. Butts
BY
J. C. Evans
HIS ATTORNEY

Dec. 13, 1966 M. R. BUTTS 3,291,383
REFRIGERATING APPARATUS
Filed Jan. 26, 1965 3 Sheets-Sheet 3
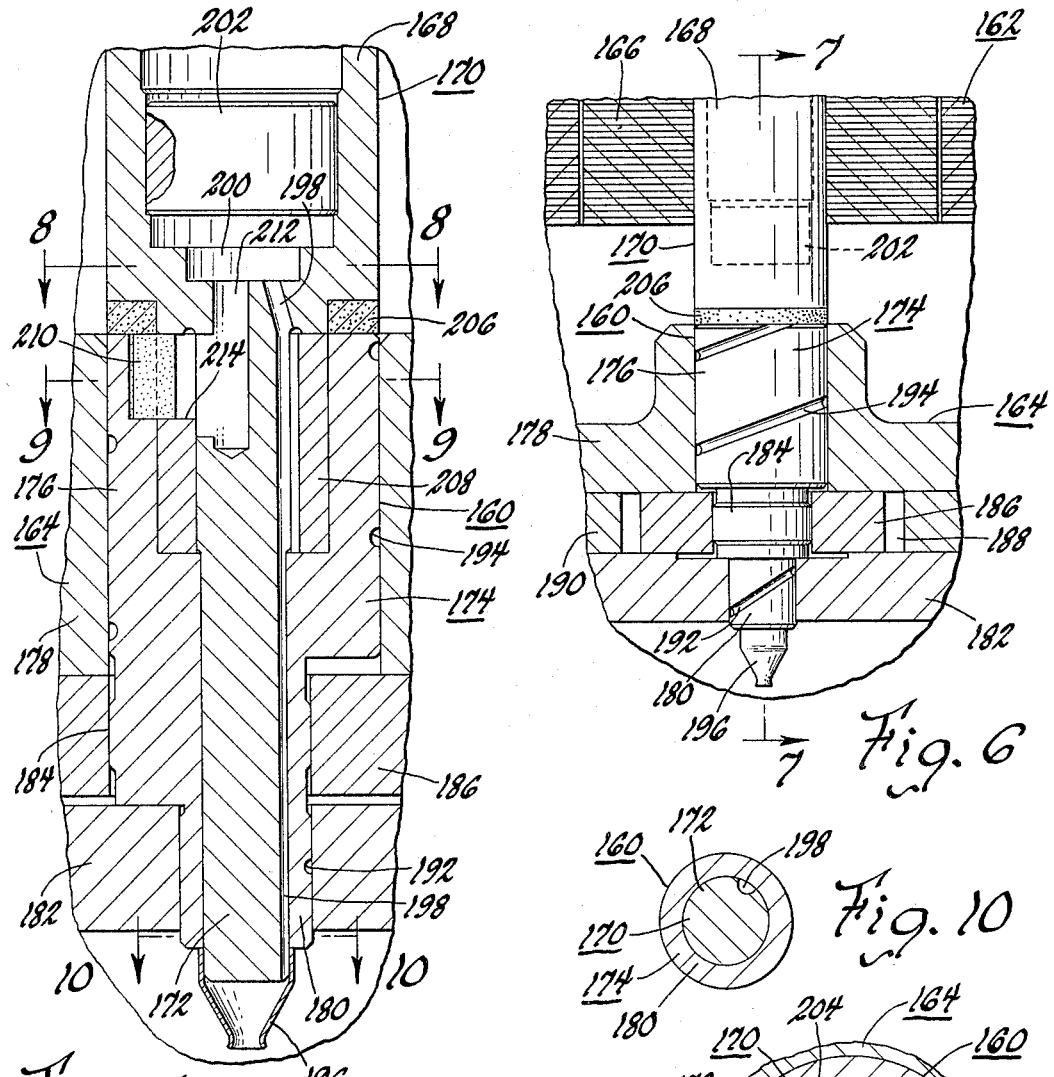
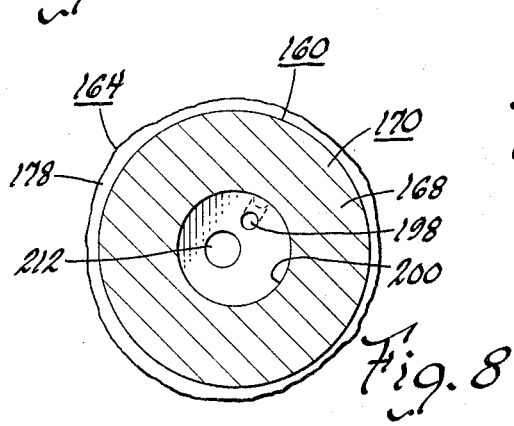
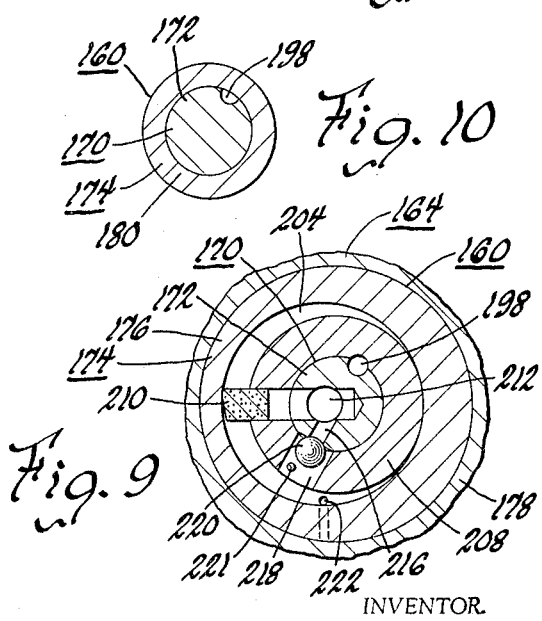
INVENTOR.
Mervin R. Butts
BY
J. C. Evans
HIS ATTORNEY United States Patent Office 3,291,383
Patented Dec. 13, 1966

1

3,291,383
REFRIGERATING APPARATUS
Mervin R. Butts, West Milton, Ohio, assignor to General Motors Corporation, Detroit, Mich., a corporation of Delaware
Filed Jan. 26, 1965, Ser. No. 428,049
15 Claims. (Cl. 230—139)

This invention relates to refrigerant compressors and more particularly to refrigerant compressors having a hermetically sealed shell enclosing an electric motor driven refrigerant pumping unit.

In hermetically sealed electric motor driven refrigerant compressors, it is desirable to utilize a two-pole electric drive motor to obtain a higher speed of rotation of the compressor piston for increasing the refrigerant capacity of the compressor for a given volumetric compressing capacity therein. Such two-pole electric motors are relatively economical but have the disadvantage of a low starting torque. One solution of the low torque start problem is to add a large capacity start capacitor in the motor circuit. This solution, however, offsets the economy advantage of two-pole motors since such capacitors are relatively expensive.

Accordingly, it is an object of the present invention to eliminate the need for capacitor units and the like in association with low starting torque electrical motors for driving hermetically sealed refrigerant compressors by the provision of means for disconnecting the electric drive motor from the compressor until it is up to speed.

A further object of the present invention is to improve hermetically sealed compressor units by the provision of a fluid coupling unit operative to selectively disconnect the electric drive motor from a driven compressor unit until the motor is up to speed whereby the motor can have a minimal number of poles for a particular compressor output.

Still another object of the present invention is to improve hermetically sealed compressor units by the provision of a fluid coupling unit utilizing the lubricant from a sump region in the hermetically sealed unit to connect the drive motor to the compressor when a predetermined amount of lubricant is fed into the fluid coupling unit and it is being driven by the motor at a speed substantially at the synchronous drive speed of the motor.

Yet another object of the present invention is to economically disconnect the electric drive motor in a hermetically sealed compressor from the compressor until the drive motor is up to speed.

Still another object of the present invention is to improve hermetically sealed compressors by the provision of a two-piece drive connection for connecting the electric drive motor to the compressor therein wherein the two-piece drive connection includes means to form the fluid chamber of a fluid coupling unit operative when the motor is at its synchronous drive speed to connect the motor to the compressor.

Still another object of the present invention is to improve hermetically sealed motor compressor units by the provision of a two-piece drive connection interconnecting the drive motor with the compressor including means for forming a fluid chamber of a fluid coupling unit operative to connect the drive motor with the compressor when the drive motor reaches its drive speed and also including means for supplying the operative fluid in the fluid coupling unit from a lubricant sump region in the hermetically sealed compressor.

Yet another object of the present invention is to provide an unusually compact fluid coupling unit in a hermetically sealed refrigerant compressor operative to connect the drive motor to the compressor when it is at

2 its synchronous drive speed wherein a part of the fluid chamber unit of the coupling is formed by an extension on the rotor of the drive motor.

Further objects and advantages of the present invention will be apparent from the following description, reference being had to the accompanying drawings wherein preferred embodiments of the present invention are clearly shown.

Figure 4:
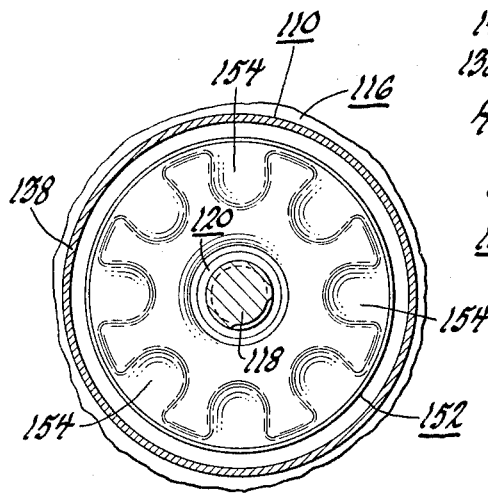
Figure 3:
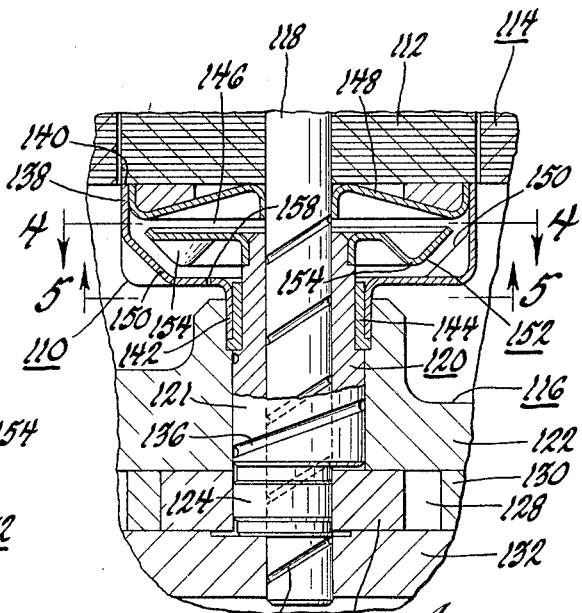
Figure 5:
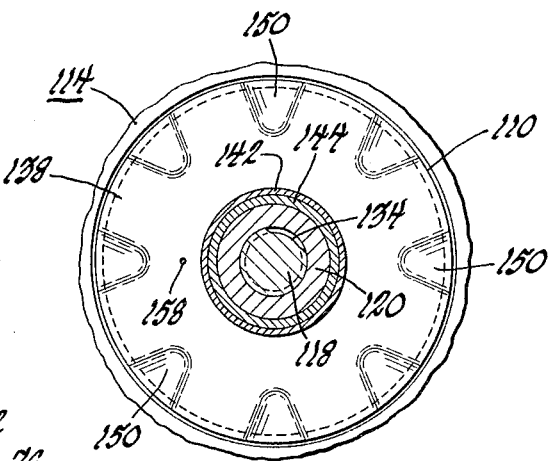
Figure 2:
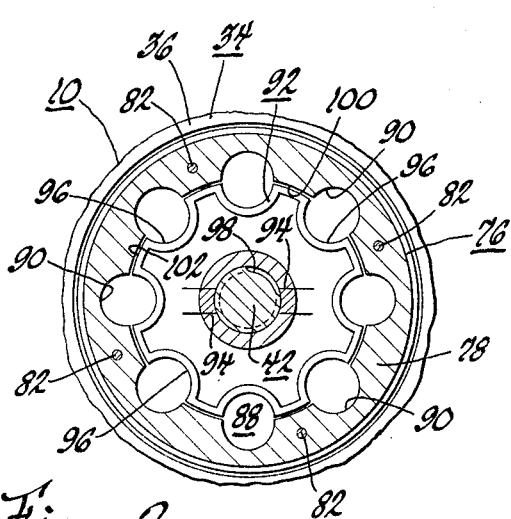

In the drawings:
FIGURE 1 is a view in vertical section of a hermetically sealed compressor including one embodiment of the present invention;
FIGURE 2 is a view in horizontal section taken along the line 2—2 of FIGURE 1;
FIGURE 3 is a fragmentary view in vertical section of a refrigerant compressor including another embodiment of the present invention;
FIGURE 4 is a view in horizontal section taken along the line 4—4 of FIGURE 3;
FIGURE 5 is a view in horizontal section taken along the line 5—5 of FIGURE 3;
FIGURE 6 is a fragmentary vertical sectional view of a compressor including another embodiment of the present invention;
FIGURE 7 is an enlarged view in vertical section taken along the line 7—7 of FIGURE 6;
FIGURE 8 is a view in horizontal section taken along the line 8—8 of FIGURE 7;
FIGURE 9 is a view in horizontal section taken along the line 9—9 of FIGURE 7; and
FIGURE 10 is a view in horizontal section taken along the line 10—10 of FIGURE 7.

Referring now to the drawings, in FIGURE 1, a hermetically sealed refrigerant compressor 10 is shown including a hermetically sealed outer shell 12 forming a lower lubricant containing sump region 14. Within the shell 12 is located a motor compressor unit 16 having a refrigerant discharge line 18 thereof directed outwardly of the shell 12 to pass through a superheat coil 20 and thence through a return line 22 into the interior of the shell 12 from whence compressed refrigerant passes through a line 24 through a condenser 26, a refrigerant expansion means shown as an elongated capillary tube 28, thence through an evaporator coil 30 and back through a suction line 32 connected to the inlet of the motor compressor unit 16.

In compressors of the hermetically sealed type for use with domestic refrigerant units, it is necessary to obtain unusually high degrees of reliability for the obvious reason that the operative parts thereof, once assembled, are inaccessible for repair. In the past, to obtain this reliability, it has been felt necessary to utilize a high quality, relatively expensive, four-pole electric drive motor having a good starting torque characteristic to immediately operate the compressor. Such compressors, however, have a limited speed output which necessarily causes the refrigerant cooling capacity of the hermetically sealed unit to depend upon the volumetric capacity of the compressor. Since the speed limitation is relatively low, the compressor volume must of necessity, for a predetermined refrigerant capacity, be relatively large and as a result, the compressor unit also is relatively expensive to construct.

In accordance with certain of the principles of the present invention, a two-pole, high-speed induction motor of a relatively low cost has been substituted for conventional four-pole motors presently used in many sealed compressor units for use in domestic refrigerant systems. The drive speed of such two-pole motors is high enough so that the volumetric capacity of the compressor can be reduced without sacrificing refrigerant capacity since the compressor of reduced size operates at higher speed.

Moreover, by reducing the size of the compressor, the cost of the compressor per se is materially reduced. In order to assure drive motor reliability in such units, it is desirable to reduce starting torques thereon. Thus, in accordance with certain other principles of the present invention, means are provided in combination with the motor compressor unit 16 to disconnect the drive motor thereof from the compressor until the motor is up to its synchronous drive speed, thus obviating the problems of undue temperature increase in the windings of the motor and the like.

Thus, with reference to FIGURE 1, the motor compressor 16 has an electric drive motor 34 with a stator 36 of the two-pole type and a rotor 38 operatively connected to a compressor unit 40 through a first elongated drive shaft member 42 having one end thereof fixedly connected to the rotor 38 and the opposite end 43 thereof directed through a second tubular drive shaft member 44 for rotation relative thereto and thence through the compressor unit 40 into the sump region 14.

More particularly, the tubular drive shaft member 44 includes a large diameter upper end 46 thereof rotatably received within an upper head, or plate, 48, of the compressor 40 and a lower end 50 bearing against a lower end plate, or head, 52, of the compressor unit 40. The shaft member 44 also includes an eccentric outer surface portion 54 directed through and in driving relationship with a rotatable piston 56 of the compressor that is disposed within a pumping chamber 58 formed by a cylinder plate 60 sandwiched between the upper end plate 48 and the lower end plate 52 and secured therebetween by a plurality of tie bolts 62 disposed circumferentially about the actual periphery thereof, one being shown in FIGURE 1.

In this embodiment of the invention, the motor compressor unit 16 is supported within the shell 12 resiliently by a plurality of spring units 64 each having one end thereof fastened over a retaining button 66 on an L-shaped bracket 68 and the opposite end thereof secured over a retaining button 70 on an integral lug 72 formed on the upper head 48.

In the illustrated motor compressor unit the upper head 48 also has an upwardly directed extension 74 thereon that supportingly receives the core of the stator 36.

To disconnect the compressor 40 from the drive motor 34 prior to the time that it attains its synchronous speed of operation, a fluid coupling assembly 76 is disposed between the motor 34 and compressor 40 for operatively connecting the first shaft member 42 to the second shaft member 44. More particularly, the fluid coupling assembly 76 includes an outer housing formed in part by a depending tubular extension 78 on the rotor 38 that has a lower open end closed by a plate 80 secured thereto by suitable fastening means such as screws 82 at the outer periphery thereof. The plate 80 has a conically shaped hollow center portion 83 that is supportingly received by a sleeve bearing 84 secured over the upper end of the shaft member 44 above the compressor 40 whereby the rotor 38 is free to rotate relative to the shaft member 44 until it attains its design speed. The extension 78 and plate 80 form a fluid chamber 88 within the fluid coupling assembly 76.

As best seen in FIGURE 2, within the fluid chamber 88, the inner surface of the extension 78 has a plurality of radially outwardly directed convolutions 90 therein disposed circumferentially around the inner surface of extension 78 in spaced relationship with respect to one another. Radially inwardly of the extension 78 is located an impeller 92 having a central hub portion thereon secured to the upper end of the shaft member 44 at 94. The impeller 92 includes a plurality of radially inwardly directed convolutions 96 disposed circumferentially about the periphery thereof at spaced points thereon corresponding in number to the convolutions 90 in the rotor extension 78.

In operation, upon energization of the motor 34, the rotor 38 causes the shaft member 42 to rotate relative to the fluid coupling impeller 92 and the second shaft member 44 so that the lower end portion thereof causes lubricant in the sump region 14 to be drawn through an upwardly directed helical groove 98 in the outer surface of the shaft member 42 so as to direct lubricant interiorly of the fluid chamber 88 of the fluid coupling assembly 76. With a sufficient amount of lubricant, the fluid chamber 88, the rotating extension 78 on the rotor 38 along with the convolutions 90 thereon will force the lubricant into fluid frictional engagement with opposed surfaces 100, 102 on the extension 78 and impeller 92, respectively, to thereby cause the rotor 38 to be fluidly locked to the impeller 92. Thus, the second shaft member 44 is fluidly connected to the motor 34 so that the eccentric 54 thereon will operate the piston 56 within the compressor 40 for circulating refrigerant through the representatively illustrated system.

The groove 98 also serves to lubricate the shaft end 43 as it rotates relative to shaft member 44. Furthermore, it supplies lubricant across the eccentric 54 into a lubricating groove 103 in the outer surface of shaft end 46.

The motor 3 is fluidly disconnected from the compressor 40 until the motor reaches its designed synchronous speed so that the two-pole motor is able to operate without an undesirable temperature increase in the stator windings thereof. Accordingly, because of the provision of the compact fluid coupling assembly 76, the reliability of the hermetically sealed unit is maintained while retaining the low-cost advantages mentioned above.

By controlling the lubricant flow across the helical groove 98 into the fluid chamber 88, in some cases the fluid coupling action of the assembly 76 may be obtained without filling the fluid chamber 88 with oil. In this case, a minimal amount of lubricant would be present in the fluid chamber 88 insufficient to cause fluid coupling between the shaft members 42, 44 until a predetermined centrifugal force were to act on the amount of fluid lubricant as, for example, when the motor attains its design speed of operation. However, in cases where the fluid chamber 88 is substantially filled with lubricant because of the configuration of the supply groove 98, it may be desirable to provide a restricted opening 104 in the plate 80 to drain the fluid chamber 88 during periods when the compressor unit is not in operation whereby, upon re-energizing the motor 34, it will be disconnected from the compressor 40 during initial startup.

Another embodiment of the invention is shown in FIGURES 3 through 5 as including a fluid coupling assembly 110 interconnecting a rotor 112 of a two-pole motor 114 with a refrigerant compressor 116 like that shown in the first embodiment.

In this embodiment, a first elongated shaft member 118 has the upper end thereof fixedly connected to the drive rotor 112 and the opposite end thereof directed through a second tubular shaft member 120 thence through the compressor 116 so that the lower end thereof is disposed within the lower sump region of the compressor like sump region 14 in the first embodiment. In this arrangement, the tubular shaft member 120 includes an upper large diameter portion 121 rotatably supported within the upper head 122 of the compressor and an eccentric surface 124 thereon directed through a pumping piston 126 of the compressor in driving relationship therewith for rotating it within a pumping chamber 128 formed in a cylinder plate 130 sandwiched between the upper plate 122 and a lower plate 132 as was the case in the first embodiment.

As in the case of the first embodiment, this arrangement includes an upwardly directed helical groove 134 in the shaft 118 that directs fluid from the sump region into a helical groove 136 formed in the outer surface of the large diameter portion of the shaft member 120 for lubricating it as well as to direct lubricant upwardly into the fluid coupling assembly 110.

In accordance with certain other principles of the present invention, the pumping assembly 110 is characterized by the fact that it is constructed of low-cost sheet metal parts to perform the fluid coupling action between the rotor 112 and the compressor 116 when the rotor reaches its design speed of operation. More particularly, the fluid coupling assembly 110 includes an outer housing formed by an upwardly directed cup-shaped sheet metal member 138 having its upper end fixedly connected at 140 to the lower end of the rotor 112 and a depending tubular portion 142 rotatably supportingly received by a sleeve bearing 144 supported within the upper head 122.

The cup-shaped member 138, in cooperation with the upper end of the shaft member 120, forms a fluid chamber 146 closed by an upper closure member 148 fits into the upper part of the housing 138. A lower inner surface of the housing member 138 is exposed to the fluid chamber 146 and includes a plurality of upwardly directed convolutions 150 formed therein circumferentially therearound at spaced points thereon serving as a fluid drive surface. These surfaces cooperate with a low-cost, opposed sheet metal impeller 152 fixedly secured at its center to the upper end of the shaft member 120. The impeller 152 includes a plurality of depending convolutions 154 that receive fluid driven thereacross by the convolutions 150 on the fluid drive convolutions 150 in fluid frictional engagement. At a predetermined speed, the impeller 152 is thereby directly coupled to the rotor 112. In addition to the low-cost features of this embodiment of the invention, the drive surfaces on the member 138 and the driven surfaces on the impeller 152 are disposed in close spaced parallelism within substantially horizontal planes so that the motor 114 may be compactly arranged with respect to the compressor 116.

As in the case of the first embodiment, if desired, a restricted drain opening 158 can be formed in the lower part of the housing 138 to drain the chamber 146 to assure that the rotor will be disconnected from the compressor 116 during the startup period.

Still another embodiment of the invention is illustrated in FIGURES 6 through 10 as including a fluid coupling assembly 160 for interconnecting a two-pole electric motor 162 to a compressor 164 as was the case in the first embodiment.

In this arrangement, a rotor 166 of the motor 162 is fixedly secured to a large diameter upper end 168 of an elongated drive shaft member 170 that includes an elongated depending portion 172 directed through and relatively rotatable with respect to a second tubular drive shaft member 174. The second drive shaft member 174 includes an upper large diameter end 176 thereon rotatably supported within an upper head 178 of the compressor 174 and also includes a lower small diameter portion 180 directed through a lower head 182 of the compressor 164 to be rotatably supported thereby. Between the upper and lower ends of the shaft member 174 is an eccentric surface 184 thereon directed through and in driving relationship with a piston 186 of the compressor 164 disposed within a pumping chamber 188 formed by a cylinder plate 190 sandwiched between the upper and lower plates 178, 182 and secured therebetween by means as shown in the first embodiment. In this embodiment of the invention, the lower end 180 of the shaft member 174 includes an upwardly directed helical groove 192 which communicates across the eccentric surface 174 with another helical groove 194 in the shaft end 176 for lubricating the bearing surfaces thereof.

Secured on the end of the elongated shaft portion 172 is a conical pickup member 196 that is rotated by the upper shaft portion 170 upon energization of the motor 162 to direct lubricant therefrom through an opening 198 formed in one side of the shaft portion 172 whereby lubricant is passed into a supply chamber 200 formed above the shaft portion 172 in the large diameter end 168. The chamber 200 is closed at its upper end by a plug 202 inserted within the shaft 170 through an upper open end thereof not shown.

In accordance with certain other of the principles of the present invention, in this arrangement the fluid coupling assembly 160 includes a fluid chamber 204 formed within the second shaft member 176 and closed at the upper end thereof by a rotatable carbon seal ring 206 supportingly received at the break between the large diameter end 168 of the drive shaft 170 and the small diameter extension 172 thereon.

Within the fluid chamber 204 is located a sleeve insert 208 press fit to the upper end of the shaft extension 172 as best seen in FIGURE 9 for rotation therewith. The sleeve insert 208 has a vane element 210 supported thereby biased radially outwardly thereof so that its outer end sealingly engages the fluid chamber forming surface of the second shaft member 176.

In this embodiment, fluid from the supply chamber 200 is directed through an opening 212 in the drive shaft 170 to communicate with a transverse passageway 214 directed through a portion of the shaft extension 172 and the sleeve insert 208 for providing the biasing action on the vane 210. Additionally, fluid through the opening 212 passes through another passageway 216 in the shaft extension 172 and across a fluid check chamber 218 in the sleeve 208. The chamber 218 has a ball check element 220 held therein by a pin 221 for closing the passageway 216 against fluid flow from the fluid chamber 204 back to the opening 212.

Thus, when the drive shaft 170 attains a predetermined speed representing the synchronous speed of the motor 162, by virtue of the above-described arrangement, the vane 210 will act on fluid trapped in the chamber 204 to fluidly connect the drive shaft 170 through the coupling assembly 160 to the upper end of the second shaft member 174 whereby the eccentric surface 184 thereon is rotated relative to the piston 186 to effect a refrigerant compressing operation.

In this embodiment of the invention a restricted opening 222 communicates with the fluid chamber 204 for draining lubricant therefrom following compressor operation to assure that the motor 162 is disconnected from the compressor 164 during a subsequent startup operation.

While the embodiments of the present invention as herein disclosed constitute preferred forms, it is to be understood that other forms might be adopted.

What is claimed is as follows:

1. In a refrigerant apparatus, the combination of, refrigerant compressor means including a piston, electric motor means including a stator and a rotor, first drive connection means including means fixedly connected to said rotor, second drive connection means including means fixedly connected to said compressor piston, said first and second drive connection means including means for forming a fluid chamber, fluid coupling means within said fluid chamber for operatively connecting said drive rotor to said compressor piston when said drive rotor attains a predetermined speed, a shell enclosing said compressor and electric motor and including a lubricant containing sump region, and means for supplying lubricant from said sump region to said fluid chamber upon energization of said electric motor means.

2. In the combination of claim 1, said lubricant supply means including pumping means operatively connected to said first drive connection means for directing lubricant through said first drive connection means into said fluid chamber upon energization of said motor means.

3. In the combination of claim 1, said lubricant supply means including a groove formed in said first drive connection means and means for directing lubricant from said sump region upwardly through said groove into said fluid chamber upon energization of said electric motor means.

4. In a refrigerant apparatus, the combination of, compressor means including a refrigerant compressing chamber and a piston unit located in said chamber, electric motor means including a stator and a rotor, means including a tubular drive connection drivingly connected to said compressor piston, an elongated shaft having one end portion thereof directed through said tubular drive connection and supported therein for rotation relative thereto and another end portion fixedly connected to said rotor, fluid coupling means interconnecting said tubular drive connection and said rotor, a shell hermetically enclosing said electric motor means and said compressor means including a lubricant containing sump region, said elongated shaft including an opening therein and means for directing lubricant from said sump region therethrough to said fluid coupling means for supplying a predetermined amount of operative fluid thereto to produce a driving connection between said electric motor means and said compressor when said rotor attains a predetermined speed.

5. In the combination of claim 4, said fluid coupling means including a fluid chamber housing formed in part by a depending member on said rotor and an impeller located within said fluid chamber fixedly connected to said tubular drive connection and operative when said rotor reaches its predetermined speed to rotate said tubular drive connection.

6. In the combination of claim 4, said fluid coupling means including a fluid chamber formed by portions of said tubular drive connection and said elongated shaft and coacting means on said tubular drive connection and elongated shaft operative to reach against fluid in said fluid chamber when said rotor reaches its predetermined speed to drivingly connect said tubular drive connection.

7. In the combination of claim 5, said depending member being formed by a cup-shaped member having a tubular extension rotatably received within a portion of said compressor means and an upper open end connected to said rotor, a convoluted fluid drive surface on said cup-shaped member at the upper open end thereof, said impeller including a convoluted fluid driven surface located in said fluid chamber adjacent said fluid drive surface and a portion fixedly secured to said tubular drive connection and operative when said convoluted fluid drive surface reaches a predetermined speed to rotate said tubular drive connection.

8. In the combination of claim 5, said depending member on said rotor being formed integrally therewith as an inverted cup extension thereon, the open end of said extension being closed by a member having a portion thereof rotatably supported by said tubular drive connection, means forming a plurality of convolutions in the inner peripheral surface of said rotor extension, said impeller being connected to said tubular drive connection and including convolutions in the outer peripheral surface thereof arranged in fluid drive relationship with said convolutions in said rotor extension whereby when lubricant is directed into said fluid chamber rotation of said rotor at said predetermined speed causes reaction forces on said impeller convolutions to rotate said impeller and said tubular drive connection for operating said compressor.

9. In the combination of claim 6, said fluid supply means for directing lubricant from said sump region into said fluid chamber including one-way fluid check means for trapping a predetermined amount of fluid in said fluid chamber operated on by said coacting coupling means to produce driving connection between said motor means and said compressor means through said elongated shaft and said tubular drive connection when said rotor attains the predetermined speed.

10. In the combination of claim 6, said coacting coupling means including a vane member slidably reciprocably supported by said elongated shaft, means for directing said vane member into sliding sealing engagement with said tubular drive connection whereby upon relative rotation between said elongated shaft and said tubular drive connection of a predetermined value said vane acts on fluid trapped in said fluid chamber to drivingly connect said elongated shaft to said tubular drive connection.

11. In the combination of claim 7, said tubular drive connection and said elongated shaft being disposed on a common vertical axis, said interacting convoluted surfaces in said fluid coupling unit being disposed in spaced relationship and in parallel, substantially horizontal planes for reducing the space between said electric motor means and said compressor means.

12. In the combination of claim 8, said elongated shaft and tubular drive connection being disposed on a common vertical axis and said rotor extension forming said fluid chamber having a substantially greater width than depth for reducing the space between said electric motor means and said compressor means.

13. In the combination of claim 9, said tubular drive connection including a restricted opening therethrough for draining lubricant from said fluid chamber following motor energization to fluidly disconnect said shaft from said tubular drive extension prior to re-energization of said electric motor.

14. In the combination of claim 10, said means for biasing said vane element into sliding sealing engagement with said tubular drive connection including fluid passageway means in said elongated shaft means for receiving pressurized fluid from said sump region against the inner surface of said vane element.

15. In the combination of claim 14, said fluid supply means including a pressurized fluid chamber in said elongated shaft and first and second passageway means for directing pressurized fluid from said chamber against the inner surface of said vane element and across said fluid check means into said fluid coupling chamber.

References Cited by the Examiner
UNITED STATES PATENTS

| | | | |
|---|---|---|---|
| 2,093,811 | 9/1937 | Kucher | 230—207 |
| 2,488,942 | 11/1949 | Schweller | 230—207 |
| 2,760,341 | 8/1956 | Kugel et al. | 230—15 |

MARK NEWMAN, *Primary Examiner.*

R. M. VARGO, *Assistant Examiner.*